United States Patent [19]
Vogel

[11] 3,766,668
[45] Oct. 23, 1973

[54] TEACHING AND LEARNING GAME

[75] Inventor: Georg Vogel, Schwieberdingen, Germany

[73] Assignee: Eurocom Establishment, Liechtenstein, Germany

[22] Filed: June 11, 1971

[21] Appl. No.: 152,350

[30] Foreign Application Priority Data
June 11, 1970 Germany.................. P 20 28 701.8

[52] U.S. Cl.......................... 35/35 H, 35/71, 35/73
[51] Int. Cl. ............................................. G09b 1/06
[58] Field of Search................... 35/35 R, 35 H, 69, 35/70, 71, 72, 73

[56] References Cited
UNITED STATES PATENTS

| | | | |
|---|---|---|---|
| 2,982,031 | 5/1961 | Bardelli.............................. | 35/69 X |
| 1,682,686 | 8/1928 | Rutherford......................... | 35/73 X |
| 3,189,350 | 6/1965 | Hopkins............................. | 35/73 X |
| 3,235,975 | 2/1966 | Pierson.............................. | 35/73 X |
| 3,414,986 | 12/1968 | Stassen.............................. | 35/72 X |
| 115,349 | 5/1871 | Palm.................................. | 35/63 X |
| 2,492,922 | 12/1949 | McLain.............................. | 35/71 |

FOREIGN PATENTS OR APPLICATIONS

| | | | |
|---|---|---|---|
| 593,736 | 6/1925 | France............................. | 35/35 H |

Primary Examiner—Wm. H. Grieb
Attorney—Arthur Schwartz et al.

[57] ABSTRACT

A teaching and learning game comprising a base plate with a pattern of regularly spaced square projections to which can be attached various information-carrying plug-in blocks which have a matching square recess. The plug-in blocks are of transparent plastic and carry the printed information on an inexpensive carrier under the cover part of the composite plug-in block. The latter may be openable for replacement of the information-carrier. Basic plug-in blocks may have a recess the size of a single projection and carry just one letter or number, or they may fit over several adjacent projections carrying an entire word or an image.

7 Claims, 18 Drawing Figures

Patented Oct. 23, 1973

*INVENTOR.*
GEORG VOGEL

BY *Arthur Schwartz*

Patented Oct. 23, 1973 3,766,668

TEACHING AND LEARNING GAME

BACKGROUND OF THE INVENTION

1. Field of the Invention

The invention relates to a teaching and learning game having plug-in blocks adapted to be secured on a base plate and bear symbols such as letters, figures, words, images or the like.

2. Description of the Prior Art

These kind of teaching and learning games have been developed especially for children of pre-school age and in the first school year of the elementary or special school, and teach the child to read and calculate through playing.

A group of such games comprises symbols, such as letters, figures, words or images, printed on cardboard pieces which must be placed on the corresponding receiving plates made from cardboard, with the same symbols. These games are not suitable for children of pre-school age as the individual members very soon become damaged or soiled. A further disadvantage of these games is that the loose cardboard pieces placed on the receiving plate are not retained. Therefore the child is not readily able to show his solution to the set task to the instructor, there is always the danger of the placed pieces of cardboard falling off or sliding.

Also teaching and learning games are known which avoid these disadvantages. The games employ a receiving or base plate which is mostly made from synthetic material, to which the selected symbol carrying members can be secured. Also the symbol carrying members are mostly made from synthetic material parts, which bear the corresponding symbols, which are applied individually, in a raised or depressed form. So as to enable better legibility, the raised or depressed areas of these symbols are then subsequently provided with a coloured coating. These games have a substantially greater length of life. However the manufactured parts are relatively expensive as one tool or a plurality of tools is required for each part with a different symbol. Therefore these games mostly only provide a limited number of different symbols, thus greatly restricting the playing and learning possibilities. An extension or alteration of the game and/or learing symbols requires new tools.

SUMMARY OF THE INVENTION

The aim of the invention is an improved teaching and learing game having plug-in blocks bearing symbols such as letters, figures, words, images or the like, and positioned on a base plate in such a way that one can attain a maximum adjustment to differing languages, script and methods of teaching with simple parts, where the same initial parts can always be used and where a greater length of life of the employed members is achieved.

The teaching and learning game according to the invention comprises a base plate having a plurality of securing means distributed on one face thereof, and a plurality of blocks, each carrying a symbol, such as a letter, word, figure or image, and being adapted to be securely positioned on the said plate by means of at least one of said securing means, each block comprising a fitting part adapted to be fitted on the said securing means, a symbol carrying part, and a fixing part adapted to fix the symbol carrying part to the fitting part so that it is enclosed within the block, at least the part or portion of the block covering the symbol on the symbol carrying part being made of a transparent material.

With blocks constructed in this way, an inexpensive print carrier, e.g., paper, can be used, which is seured and perfectly protected in the block. For this reason a greater length of life is obtained for the game. An extension or alteration of the block symbols only requires new print sheets with new symbols. Thus the game can be adapted very quickly and simply to different languages, scripts or methods or learning. As the parts of the blocks are independent from the symbols, they can be mass-produced inexpensively Extension of the playing and learning possibilities is provided for in an embodiment of the invention where the blocks are manufactured in varying sizes. Then for example the smallest block can be used to receive a print carrier having a letter of a figure. A larger block can for example receive a print carrier of one word. A still larger block can for example contain an image print carrier.

If particular value is laid on altering the assembled blocks, then the invention provides the possibility that both parts of a block can be releasably connected with one another. However the arrangement can also be such that both parts of a block carry means by means of which they — therefor can be non-releasably connected with one another. This arrangement is preferred when dealing with blocks which carry the always necessary basic symbols on the print carrier.

BRIEF DESCRIPTION OF THE DRAWINGS

The invention will now be described, by way of example, with the aid of the accompanying drawings.

DESCRIPTION OF THE PREFERRED EMBODIMENTS

Figure 1:
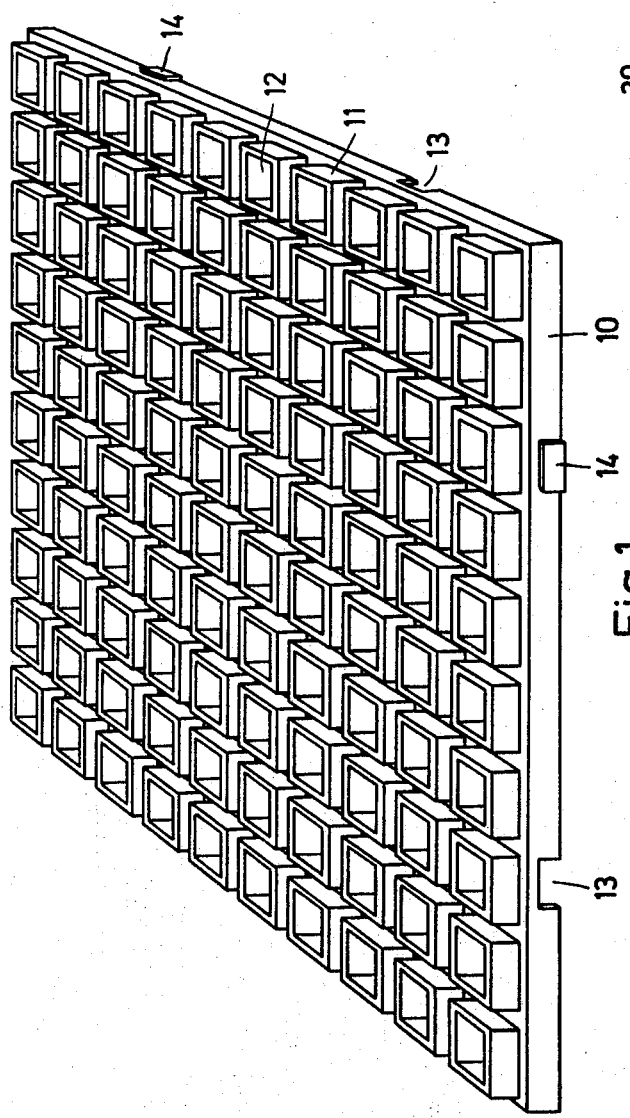
FIG. 1 shows a first embodiment of a base plate.

FIG. 1 shows a base plate 10 with uniformly arranged projections 11 which form a regular plug-in grid. These projections 11 are adapted in cross-section to receive the plug-in blocks. Each of these projections 11 is provided with a through-hole 12 so that a block positioned on the profection can be pushed off by pressure from the underside of the plate 10. The side walls of the plate 10 bear dovetail-shaped connecting elements 13 and 14 so that a plurality of plates 10 can be joined together.

Figure 3:
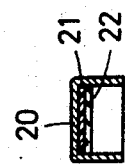
FIG. 3 illustrates a section through the plug-in block according to FIG. 2.
Figure 2:
FIG. 2 shows a first embodiment of a plug-in block.

As FIGS. 2 and 3 show, a plug-in block can be formed by a transparent cap-like plug-in part 20, the size of which is adapted to lightly fit over of the projections 11 of plate 10 according to FIG. 1. A matching printed symbol carrier 21 is positioned in the bottom of the recess of plug-in part 20. This carrier piece 21 is provided on its upper side with the printed symbol e.g., a letter A. The carrier 21 is secured in the plug-in part 20 by means of a retaining piece 22.

Figure 4:
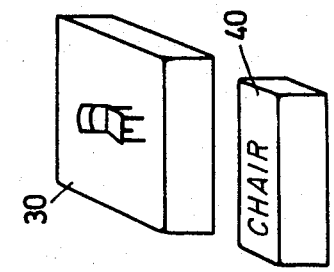
FIG. 4 is a larger image plug-in block.
Figure 5:
FIG. 5 shows an average size word plug-in block.

The larger plug-in blocks 30 and 40 according to FIGS. 4 and 5 are arranged in a similar way, the printed symbol carrier carrying an image or a word. The size of these plug-in blocks is adapted to the grid pattern of the plug-in plate, and the dimensions of their recesses being such that they snugly fit over several projections 11 of the plug-in plate 10.

Figure 6:
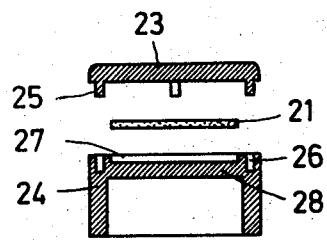
FIG. 6 illustrates in section, the parts of a composite block of another type which can be opened and closed.
Figure 7:
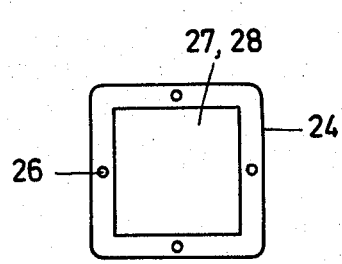
FIG. 7 is a plan view of the plug-in part of the plug-in block according to FIG. 6.

The parts of a plug-in block can also be differently composed as shown in FIG. 6. Plug-in part 28 having side walls 24, is itself constructed in a cap-like manner and fit over the projections 11 of plug-in plate 10. The upper side of the plug-in part 28 carries a recess 27 for carrier 21. The transparent covering part 23 carries connecting pins 25 which are secured in bores 26 of plug-in part 28. It can be seen from FIG. 7 how these bores 26 are arranged in the edge of plug-in part 28 surrounding the recess 27.

Figure 8:
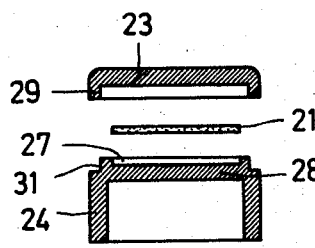
FIG. 8 shows a first variant of the plug-in block according to FIG. 6 with different closure members.
Figure 10:
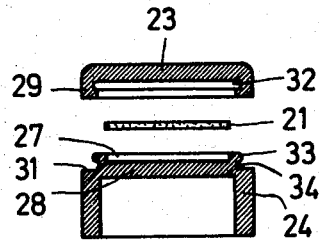
FIG. 10 shows a second variant of a plug-in block according to FIG. 6 with snap closure members.
Figure 9:
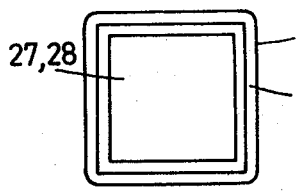
FIG. 9 is a plan view of the plug-in part of the plug-in block according to FIG. 8.
Figure 11:
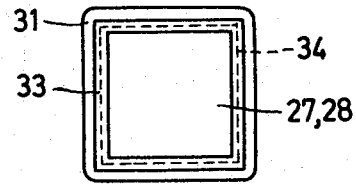
FIG. 11 is the plan view of the plug-in part of the plug-in block according to FIG. 10.

As can be seen from FIG. 8, the transparent covering part 23 can also be cap-shaped The peripheral wall 29 of covering part 23 overlaps the edge section 31 of plug-in part 28 which again forms a recess 27 for carrier 21. FIG. 8 clearly shows how edge section 31 is arranged surrounding plug-in part 28. As with the previously illustrated plug-in blocks, edges of the plug-in part 28 and covering part 23 are rounded off. FIGS. 10, 11 show that the covering part 23 can also be non-releasably connected with plug-in part 28. The peripheral wall 29 of covering part 23 carries a snap groove 32 on the inner side. The edge section 31 of plug-in part 28 includes a matching head 33 having an undercut 34. After carrier 21 is inserted into recess 27 of the plug-in part 28 and covering part 23 is snapped in place, then both parts are connected non-releasably to one another.

Figure 12:
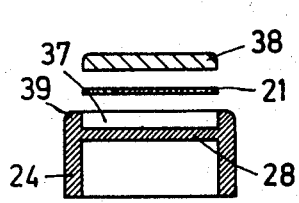
FIG. 12 illustrates a plug-in block with an insertable covering part.
Figure 13:
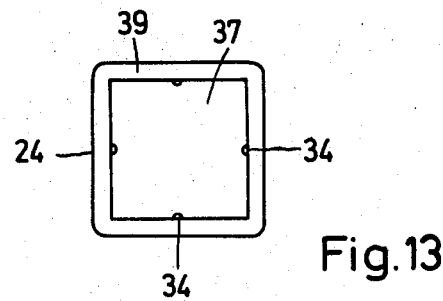
FIG. 13 is the plan view of the plug-in part of the plug-in block according to FIG. 12.
Figure 14:
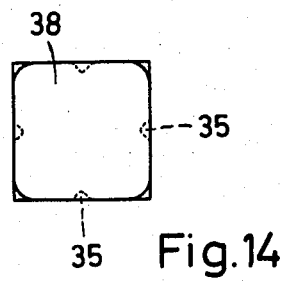
FIG. 14 is the plan view of the covering part of the plug-in block according to FIG. 12.

In plug-in part 28 according to FIG. 12, peripheral wall 39 is so arranged that carrier 21 and transparent covering part 38 can be inserted. Recess 37 includes retaining nubs 34 on all or at least two opposing sides, as can be seen from FIG. 13. Covering part 38, according to FIG. 14 carries matching notches 35. The inserted covering part 38 is thereby secured non-releasably with plug-in part 28.

Figure 15:
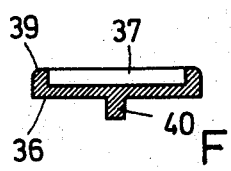
FIG. 15 illustrates a plug-in block, the plug-in part of which bears plug-in members for the plug-in plate, without covering part.
Figure 17:
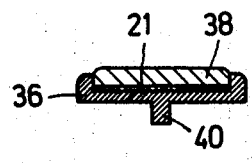
FIG. 17 illustrates in section, the plug-in block according to FIG. 15 with inserted covering and, FIG. 18 shows a base plate for receiving plug-in blocks according to FIG. 17.
Figure 16:
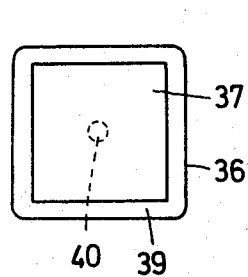
FIG. 16 is the plan view of the plug-in part of the plug-in block according to FIG. 15.
Figure 18:
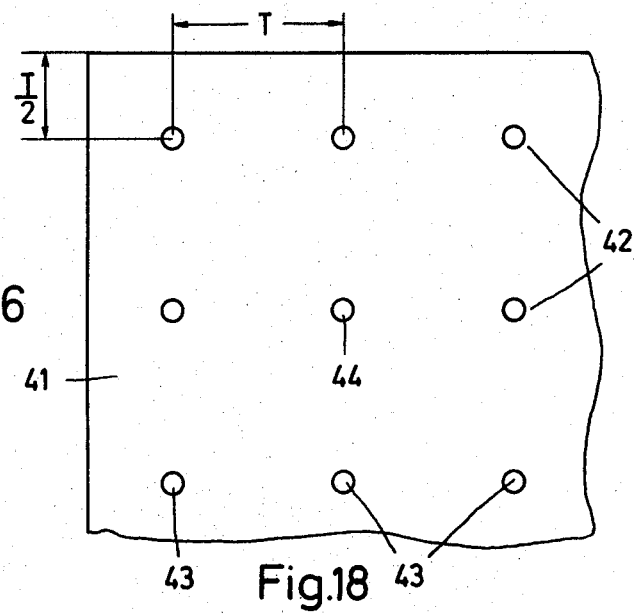

FIG. 15 shows a plug-in part 36 which carries insertion pins or pegs 40 on the underside. The upper side of part 36 carries peripheral wall 39 which can accommodate a carrier 21 as well as a covering part 38, as is clearly shown in FIG. 17. FIG. 16 shows the central arrangement of insertion peg 40. These plug-in blocks require a base plate 41 having plug-in holes 44 which are arranged in rows 43 and columns 42 with a spacing T. This spacing corresponds to the dimensions of the smallest plug-in block, which is also called basic block. The outer rows and columns of the plug-in recesses are arranged half a spacing T/2 from the edge of the plate 41 as the insertion pegs 40 of part 36 are arranged in the centre.

What is claimed is:

1. A teaching and learning game comprising in combination:
    a base plate;
    a plurality of adjacent rows of regularly spaced, generally prismatic anchoring projections arranged on one side of the base plate so as to form a geometric grid, each projection having a central aperture which extends through the base plate;
    a plurality of information-carrying blocks, each including an upper cover face of transparent material and an information carrier under the cover face in contiguous relationship with the latter; the blocks further having generally prismatic recesses which match and cooperate with the prismatic projections on the base plate in such a way that the blocks can be securely attached to the base plate in any one of the grid positions and removed therefrom by reaching through the projection apertures and lifting the blocks from their projections;
    the upper transparent cover face of the information-carrying blocks being in the form of a cover cap; and
    each block including means for positioning the information carrier under the cap and means for removably attaching the cap to the block, in order to provide access to the information carrier for alteration and replacement.

2. The article as defined in claim 1, wherein
    the information-carrying blocks are of different lengths and widths and include: small blocks which engage only a single base plate projection, elongated blocks which engage several adjacent base plate projections in a grid row by means of a common elongated recess; and elongated and widened blocks which engage several adjacent base plate projections of more than one grid row by means of a common elongated and widened recess.

3. The article as defined in claim 1, wherein
    each information-carrying block further includes an upper transverse wall, the positioning means for the information carrier being in the form of a recess in the upper side of the transverse wall.

4. The article as defined in claim 3, wherein
    the recesses for the information carrier in the information-carrying blocks and the cover caps are so arranged that the latter fit into the recesses,
    the attachment means for the cover caps including cooperating nubs and notches in the adjacent peripheral walls of the recesses and cover caps, respectively, thereby retaining the cover caps.

5. The article as defined in claim 1, wherein the attachment means for the cover cap of the information-carrying blocks are in the form of matching pins and bores arranged in the blocks and cover caps, respectively.

6. The article as defined in claim 1, wherein the attachment means for the cover cap of the information-carrying blocks are in the form of matching peripheral ledges and peripheral recesses arranged on the blocks and cover caps, respectively.

7. The article as defined in claim 23, wherein the base plate further includes on at least one end face thereof a male connector and a female connector spaced from one another, the connectors being in the form of matching recesses and protrusions which are arranged to cooperate with identically spaced male and female connectors of a second base plate.

* * * * *